(12) United States Patent
Balasubramanian et al.

(10) Patent No.: US 12,072,518 B2
(45) Date of Patent: Aug. 27, 2024

(54) OPTICAL ARTICLES WITH SPECIFIC COLOR GLARE

(71) Applicant: Essilor International, Charenton-le-pont (FR)

(72) Inventors: Srinivasan Balasubramanian, Dallas, TX (US); Aref Jallouli, Dallas, TX (US); Christelle Marck, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 540 days.

(21) Appl. No.: 17/299,832

(22) PCT Filed: Dec. 4, 2019

(86) PCT No.: PCT/EP2019/083671
§ 371 (c)(1),
(2) Date: Jun. 4, 2021

(87) PCT Pub. No.: WO2020/115128
PCT Pub. Date: Jun. 11, 2020

(65) Prior Publication Data
US 2022/0026612 A1    Jan. 27, 2022

(30) Foreign Application Priority Data
Dec. 6, 2018   (EP) .................................... 18306636

(51) Int. Cl.
*G02B 5/30*    (2006.01)
*G02B 5/20*    (2006.01)
(Continued)

(52) U.S. Cl.
CPC ............. *G02B 5/3025* (2013.01); *G02B 5/20* (2013.01); *G02C 7/104* (2013.01); *G02C 7/12* (2013.01)

(58) Field of Classification Search
CPC ........ G02B 5/3025; G02B 5/20; G02C 7/104; G02C 7/12; G02C 7/10
See application file for complete search history.

(56) References Cited

U.S. PATENT DOCUMENTS 2,298,058 A    10/1942 Land
2001/0014988 A1    8/2001 Inuzuka
(Continued)

FOREIGN PATENT DOCUMENTS

EP    2284600    2/2011
WO    WO 2017/070552    4/2017

OTHER PUBLICATIONS

International Search Report and Written Opinion of the International Search Authority issued in corresponding International application No. PCT/EP2019/083671, mailed Jan. 31, 2020.

*Primary Examiner* — Darryl J Collins
*Assistant Examiner* — Matthew Y Lee
(74) *Attorney, Agent, or Firm* — Norton Rose Fulbright US LLP (57) ABSTRACT

The optical articles disclosed herein render polarized glare in a certain tunable color that is visually more perceptive than a regular tinted lens or a regular polarized lens. Optical articles, including sunglass lenses, that are configured to color plane-polarized light transmitted through the lens will draw the wearer's attention and help identify the contours or dangers on surfaces in the wearer's field of vision.

10 Claims, 9 Drawing Sheets

(51) Int. Cl.
*G02C 7/10* (2006.01)
*G02C 7/12* (2006.01)

(56) References Cited

U.S. PATENT DOCUMENTS

2009/0122261 A1  5/2009  Chou et al.
2017/0139234 A1* 5/2017  Sharp .................. G02B 27/288
2017/0176775 A1* 6/2017  Mappes ................ G02C 7/108

* cited by examiner

| Lens ID | L (10°) | a*(10°) | b*(10°) | C (10°) | h (10°) | R | G | B | Tv(%) D65, 2° |
|---|---|---|---|---|---|---|---|---|---|
| Blue Polarized lens: First color tint (B) | 75 | -14 | -15 | 20 | 227 | 139 | 194 | 210 | 47.4 |
| Second color tint (C) | 55 | 19 | 13 | 23 | 33 | 171 | 119 | 110 | 23.2 |
| B1 Sample - Blue tinted Grey: Final color tint (A) | 41 | 0 | -4 | 4 | 276 | 94 | 97 | 102 | 11.5 |

A: Incident light is randomly polarized:
Characterized by: $h_1$, $C_1$, $L_1$, $a^*_1$, $b^*_1$

FIG. 7A

B: Incident light is polarized perpendicular to the lens polarization axis
Characterized by: $h_2$, $C_2$, $L_2$, $a^*_2$, $b^*_2$

OPTICAL ARTICLES WITH SPECIFIC COLOR GLARE

CROSS-REFERENCE TO RELATED APPLICATIONS

This application is a national phase application under 35 U.S.C. § 371 of International Application No. PCT/EP2019/083671 filed 4 Dec. 2019, which claims priority to European Patent Application No. 18306636.4 filed 6 Dec. 2018. The entire contents of each of the above-referenced disclosures is specifically incorporated by reference herein without disclaimer.

FIELD OF THE INVENTION

The present invention generally relates to optical articles that highlight glare-causing areas to a user.

BACKGROUND

Light is typically non-directional, and light wave oscillations are typically not uniformly aligned, i.e., light waves are randomly oriented in all directions. When light is reflected from flat surfaces, it tends to become plane-polarized, meaning light wave oscillations are uniformly aligned in the same (usually horizontal) direction. This creates a bothersome and potentially dangerous intensity of reflected light that causes glare and reduces visibility.

Sunglass lenses primarily exist as one of two types: (1) tinted, non-polarized; and (2) polarized. Tinted, non-polarized sunglasses employ a color tint that reduces light transmission through the lens. Due to the absence of a polarizing filter, these sunglass lenses do not block polarized glare. Polarized lenses include a polarizing filter and block most of the polarized glare light.

In some instances, it is beneficial for a sunglass wearer to employ polarized lenses. Boaters and fishermen, for example benefit from polarized lenses' ability to reduce reflected glare from the water surrounding them. Tinted, non-polarized lenses would not reduce glare reflected from the water.

Many sunglasses exist as one of the two extremes—polarized lenses that block the majority of plane-polarized light, and tinted lenses that reduce transmittance over certain wavelength ranges and do not block plane-polarized light. However, in some instances, it is beneficial for a sunglass wearer to employ lenses that highlight and call attention to plane-polarized light.

People involved in outdoor activities such as skiing, skating, bike riding, and driving benefit from viewing some level of polarized glare. For example, an automobile driver driving on an icy road would benefit from noticing icy patches that reflect plane-polarized light. To that end, it would be beneficial to produce a sunglass lens or other optical article that allows some plane-polarized light to pass through the lens. It would also be beneficial to render the polarized glare in a certain tunable color that is visually more perceptive than a regular tinted lens or a regular polarized lens. Lenses that are configured to color plane-polarized light transmitted through the lens will draw the wearer's attention and help identify the contours or "dangers" on the surface.

SUMMARY

The present disclosure solves this problem by providing optical articles that partially transmit polarized glare in tunable colors that help a user see surface contours. This type of optical article can find application in active sports such as skiing, skating, bike riding, and water sports, and in detecting potentially dangerous surfaces such as black ice, such an optical article is described in claims 1 to 14.

Some aspects of the disclosure are directed to an optical article configured to color plane-polarized light transmitted through the optical article. In some embodiments, the optical article has a color (A) and comprises an optical article base material, a polarizing layer having a first color tint of color (B), and a second color tint of color (C), wherein the difference in polarizing efficiency ($\Delta PE(\lambda)$) of light transmitted through the optical article is at least 30% between a first visible wavelength and a second, different visible wavelength; the overall PE of the optical article is less than 90%; and the color difference ($\Delta E$) between the optical article color (A) and the first color tint color (B) is greater than 2. $PE(\lambda)$ is the polarizing efficiency as a function of wavelength and is represented by the equation:

$$PE(\lambda)=[(T(\lambda)_{par}-T(\lambda)_{perp})/(T(\lambda)_{par}+T(\lambda)_{perp})]*100 \quad (I)$$

where $T(\lambda)_{par}$ and $T(\lambda)_{perp}$ are transmittance of light polarized parallel to the polarization axis of the lens at wavelength $\lambda$, and transmittance of light polarized perpendicular to the polarization axis of the lens at wavelength $\lambda$, respectively. The overall polarizing efficiency is represented by the equation:

$$PE=[(\tau_v(par)-\tau_v(perp))/(\tau_v(par)+\tau_v(perp))]*100 \quad (II)$$

where $\tau_{v(par)}$ and $\tau_{v(perp)}$ are visible light transmittance of light polarized parallel and perpendicular to the polarization axis of the lens, respectively. The $\tau_v$ values are in turn calculated from the formula:

$$\tau_v\% = \frac{\sum D(\lambda)*V_M(\lambda)*t(\lambda)*\Delta\lambda}{\sum D(\lambda)*V_M(\lambda)*\Delta\lambda} \quad (III)$$

where $\tau_v$ % is visible light transmission; $D(\lambda)$ is spectral distribution of CIE illuminant D65; $V_M(\lambda)$ is CIE standard photopic luminous efficiency; $t(\lambda)$ is spectral transmittance in the 380-780 nm range; and $\Delta\lambda$ is wavelength interval. $\lambda E$ values are calculated by the formula:

$$\Delta E=\sqrt{(L_1-L_2)^2+(a*_1-a*_2)^2+(b*_1-b*_2)^2} \quad (IV)$$

where $\lambda E$ is the color difference between two lenses, L is lightness, a* is the green-red color component, b* is the blue-yellow color component, and the subscripts refer to the corresponding parameters of a first lens and a second lens.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%. The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes a optical articles that confer a tunable color of light to plane-polarized light transmitted through the optical article.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE FIGURES

FIGS. 2A-2D.

FIGS. 7A-7B.

DETAILED DESCRIPTION

Some aspects of the disclosure are directed to an optical article configured to color plane-polarized light transmitted through the optical article. In some embodiments, the optical article has a color (A) and comprises an optical article base material, a polarizing layer having a first color tint of color (B), and a second color tint of color (C), wherein the difference in polarizing efficiency ($\Delta PE(\lambda)$) of light transmitted through the optical article is at least 30% between a first visible wavelength and a second, different visible wavelength; the overall PE of the optical article is less than 90%; and the color difference ($\Delta E$) between the optical article color (A) and the first color tint color (B) is greater than 2.

In some embodiments, the resulting difference in hue ($\Delta h$, expressed in degrees) between a hue of randomly-polarized light transmitted through the optical article and a hue of perpendicularly-polarized light transmitted through the optical article is at least 20, and the lightness in response to perpendicularly-polarized light (L2) transmitted through the optical article is greater than 20. $\Delta h$ is represented by equation V or equation VI below:

$$\Delta h = |h_r - h_\perp| \text{ when } \Delta h \leq 180 \quad (V)$$

$$\Delta h = 360 - |h_r - h_\perp| \text{ when } \Delta h > 180 \quad (VI)$$

where $h_r$ and $h_\perp$ are the hue of randomly polarized and perpendicularly polarized white light (D65) transmitted through the lens, respectively.

In some embodiments, a randomly-polarized light color transmission difference ($\Delta E_r$) between the optical article and a control is less than 20. In some aspects, a perpendicularly-polarized light color transmission difference ($\Delta E_p$) between the optical article and a control is greater than 30. In embodiments, the overall polarizing efficiency is between 10% and 90%. In some embodiments the optical article exhibits a difference in polarizing efficiency ($\Delta PE(\lambda)$) of greater than 30% in the range of 450 to 650 nm.

The first color tint may be provided within the polarizing layer, in some aspects. The first color tint may be a dichroic dye or a mixture of dichroic dyes. In some aspects, the second color tint is a color-balancing tint that balances the color of the first color tint. The second color tint may be provided within the polarizing layer, on a surface of the polarizing layer, on an additional film laminated or cast on the lens, within the optical base material, or on a surface of the optical base material, or any combination thereof. In some aspects, the second color tint is a dye or a mixture of dyes.

An optical article having first and second color tint may have a tint close to a control lens. A control lens is a polarized lens having a color tint that is comparable to a target tint for optical article A. Exemplary, non-limiting examples of control lenses include a standard grey polar lens ($-6<a*<-1$; $-3<b*<2$), a standard brown polar lens ($7<a*<14$; $32<b*<41$), and a standard grey-green polar lens ($-8<a*<-4$; $6<b*<11$). The control lenses exhibit a % $\tau_v$ in the range of about 8% to 18%. In some embodiments, the optical article is a sunglass lens, a goggle lens, a contact lens, a helmet shield, a windshield, a vehicle window, or a building window.

In some embodiments, the optical article has an a* ranging from −10 to 10 and a b* ranging from −10 to 10. In some aspects, the optical article has an a* ranging from 0 to 20 and a b* ranging from 25 to 45. In further aspects, the optical article has an a* ranging from −20 to 0 and a b* ranging from 0 to 20.

In some aspects, the optical article exhibits an average visible light transmittance over a spectrum of visible light from about 8% to about 18%. In some embodiments, perpendicularly-polarized light is perpendicularly-polarized with respect to a polarizing direction of the optical article polarizing layer. In embodiments, the color of plane-polarized light transmitted through the optical article does not change as the angle of polarization changes. In some embodiments, an intensity of plane-polarized light transmitted through the optical article changes as the angle of polarization changes. In some aspects of the disclosure, at least one of a first color tint color and a second color tint color can be adjusted to tune the color of plane-polarized light transmitted through the optical article.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention pertains to optical articles that partially transmit polarized glare in certain colors to help visualize surface contours. By conferring a color to light reflected from a glare-causing area, a wearer can perceive and differentiate glare-causing areas from others. Lenses based on this type of optical article can find application in active sports such as skiing, skating, bike riding, and water sports, and in detecting potentially dangerous surfaces such as black ice.

The inventive approach begins with a lens having a first color tint and exhibiting a low polarizing efficiency (PE <90%, PE calculated according to equation II above). A lens having having a first color tint and exhibiting a low polarizing efficiency is then provided with a second color tint that bestows a color to plane-polarized light, i.e., glare, to provide an improved perception of glare. The second color tint may be applied by any process known to those of skill in the art. For example, U.S. Patent Publication No. 2001/0014988, the entirety of which is hereby incorporated by reference, discloses a method for color tinting plastic lenses.

Figure 1:
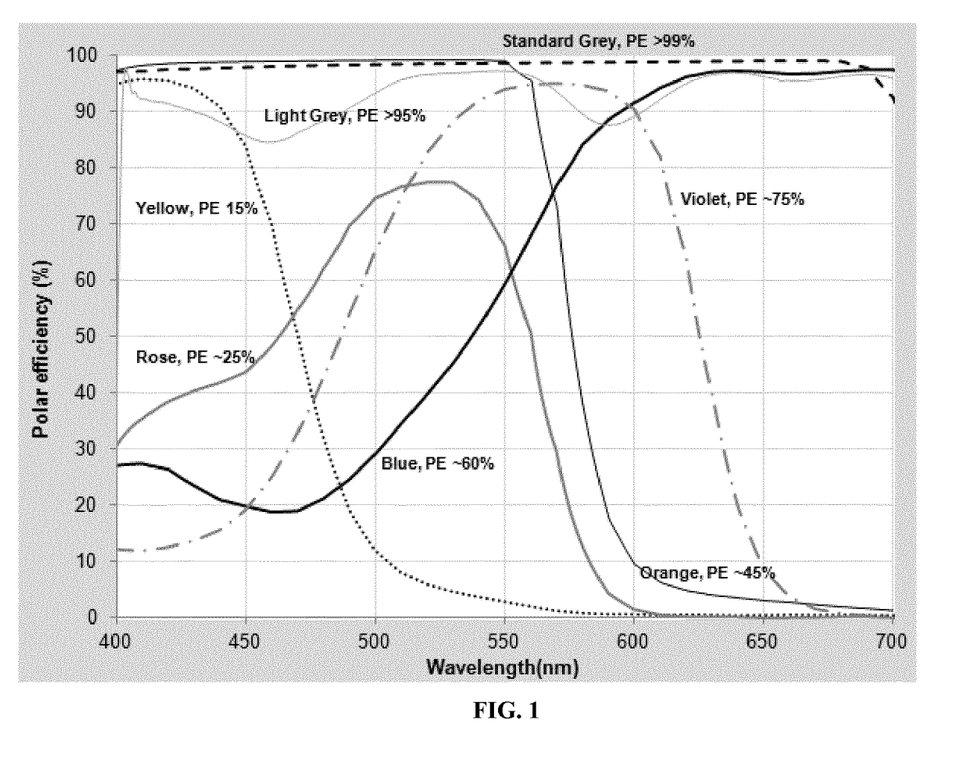
FIG. 1 is a graph depicting polarizing efficiency as a function of wavelength for various lenses with variable polarizing efficiencies. Also included is a standard grey polarizing lens that blocks over 99% of plane-polarized light across the visible spectrum.
Figure 2:
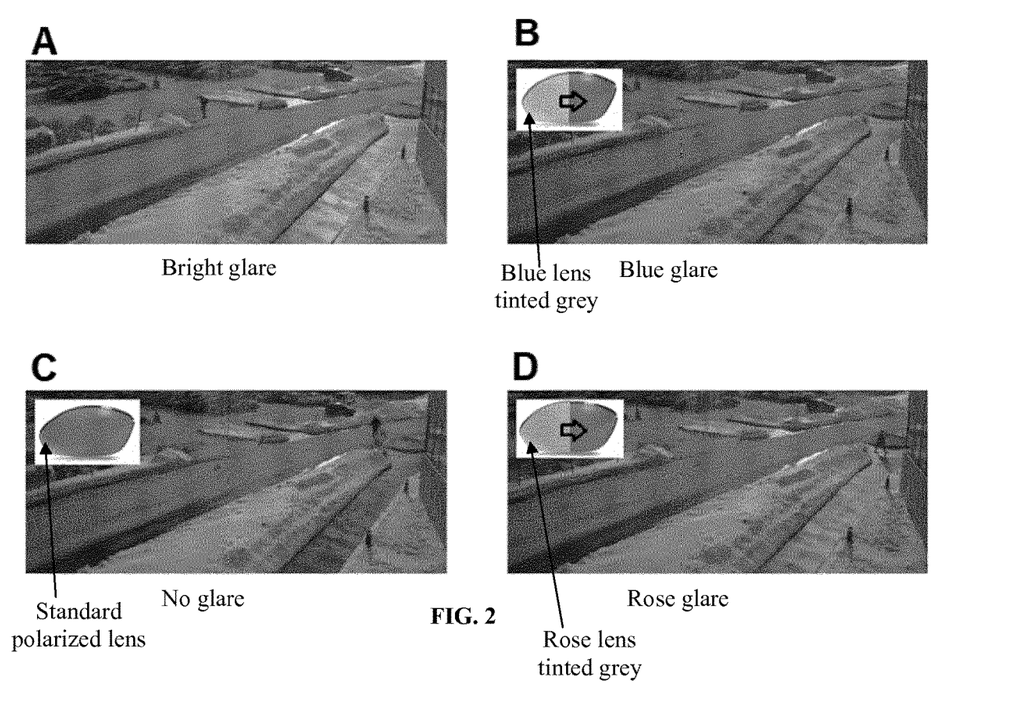
FIG. 2A is image of an icy sidewalk viewed without sunglasses.
FIG. 2B is an image of the icy sidewalk viewed through lenses of the present invention that enhances perception of the icy sidewalk.
FIG. 2C is an image of the icy sidewalk viewed through conventional polarized lenses. In this case, the icy sidewalk is not highlighted.
FIG. 2D is an image of the icy sidewalk viewed through lenses of the present invention that enhances perception of the icy sidewalk.
Figure 3:
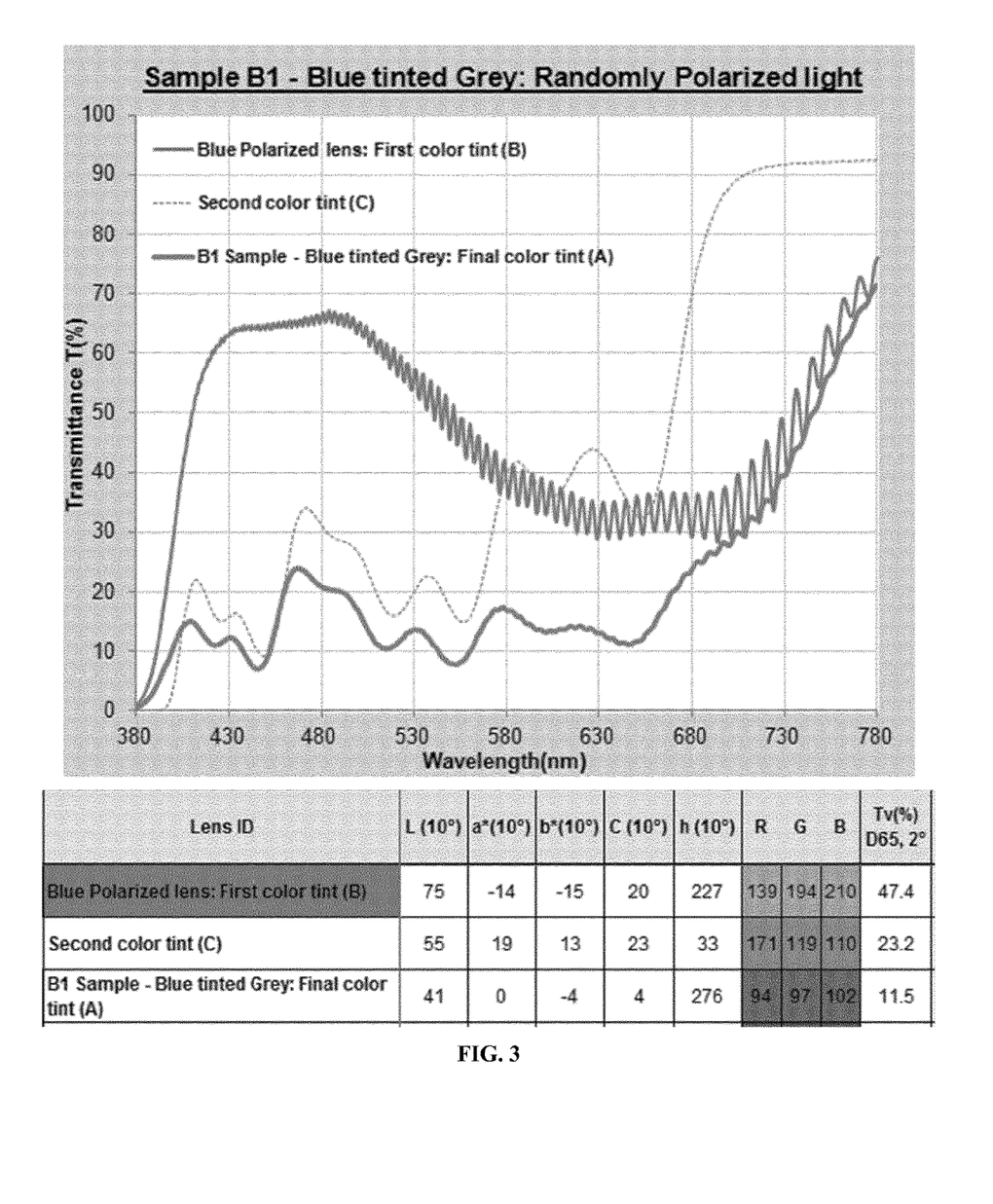
FIG. 3 is a graph that depicts transmittance across various visible wavelengths of a low polarizing efficiency blue-tinted lens (first color tint B), second color tint C, and a grey lens product (final color tint A) that includes both the low polarizing efficiency blue-tinted lens and the second color tint.
Figure 4:
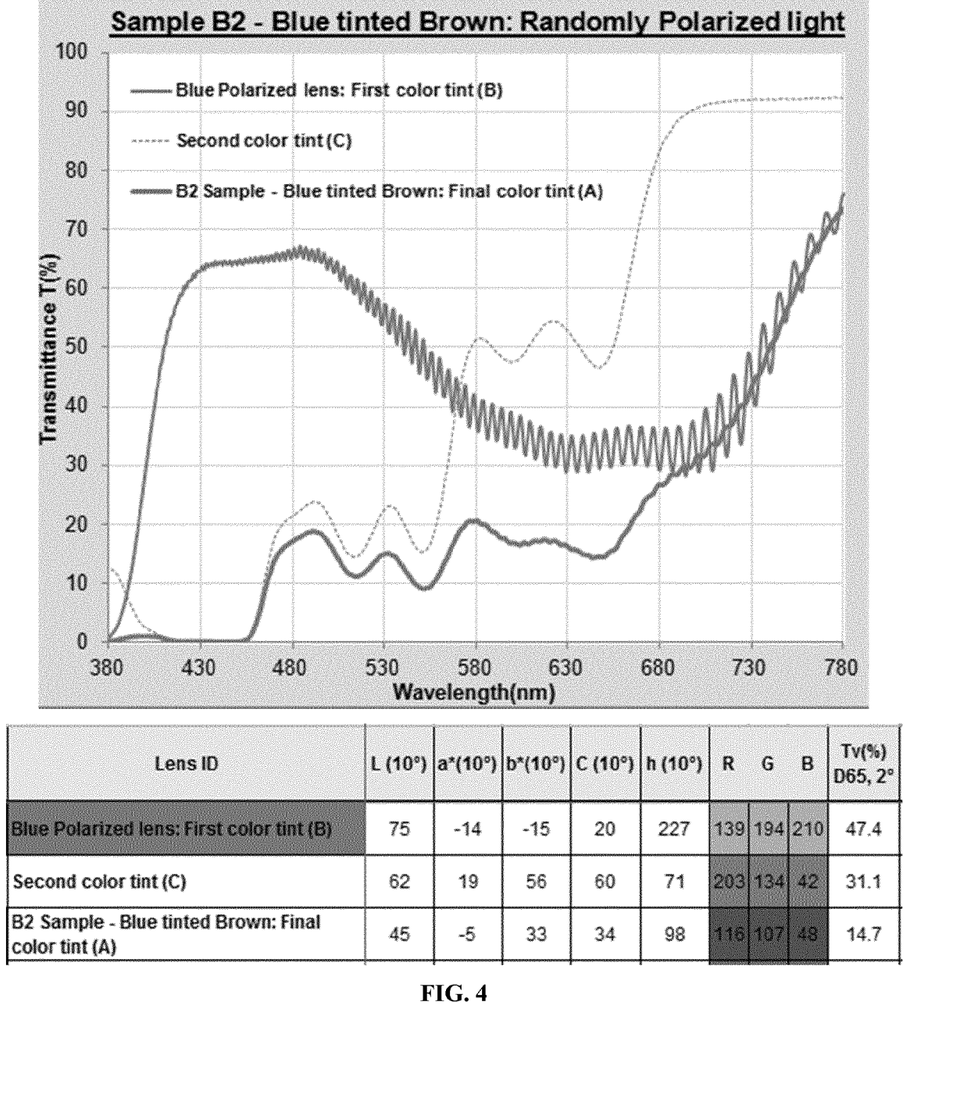
FIG. 4 is a graph that depicts transmittance across various visible wavelengths of a low polarizing efficiency blue-tinted lens (first color tint B), a second color tint C, and a brown lens product (final color tint A) that includes both the low polarizing efficiency blue-tinted lens and the second color tint.
Figure 5:
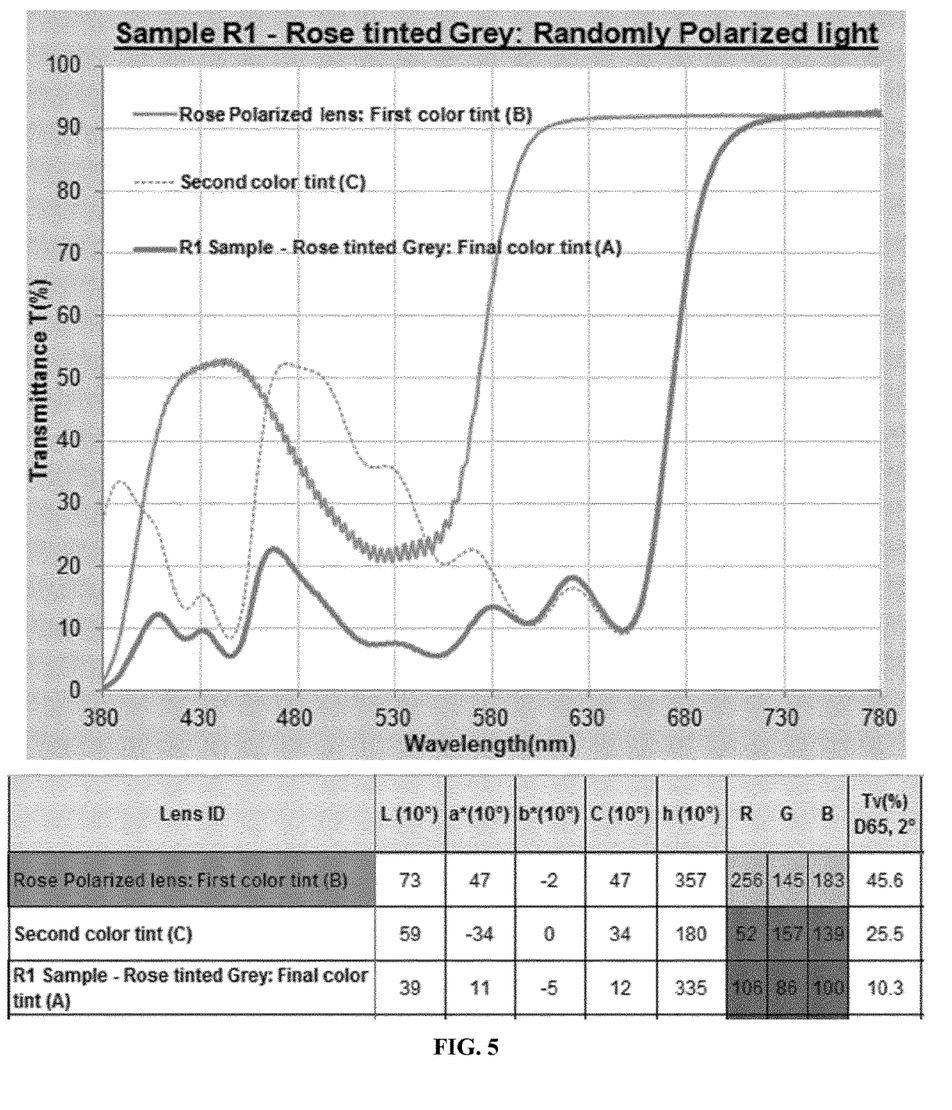
FIG. 5 is a graph that depicts transmittance across various visible wavelengths of a low polarizing efficiency rose-tinted lens (first color tint B), a second color tint C, and a grey lens product (final color tint A) that includes both the low polarizing efficiency rose-tinted lens and the second color tint.
Figure 6:
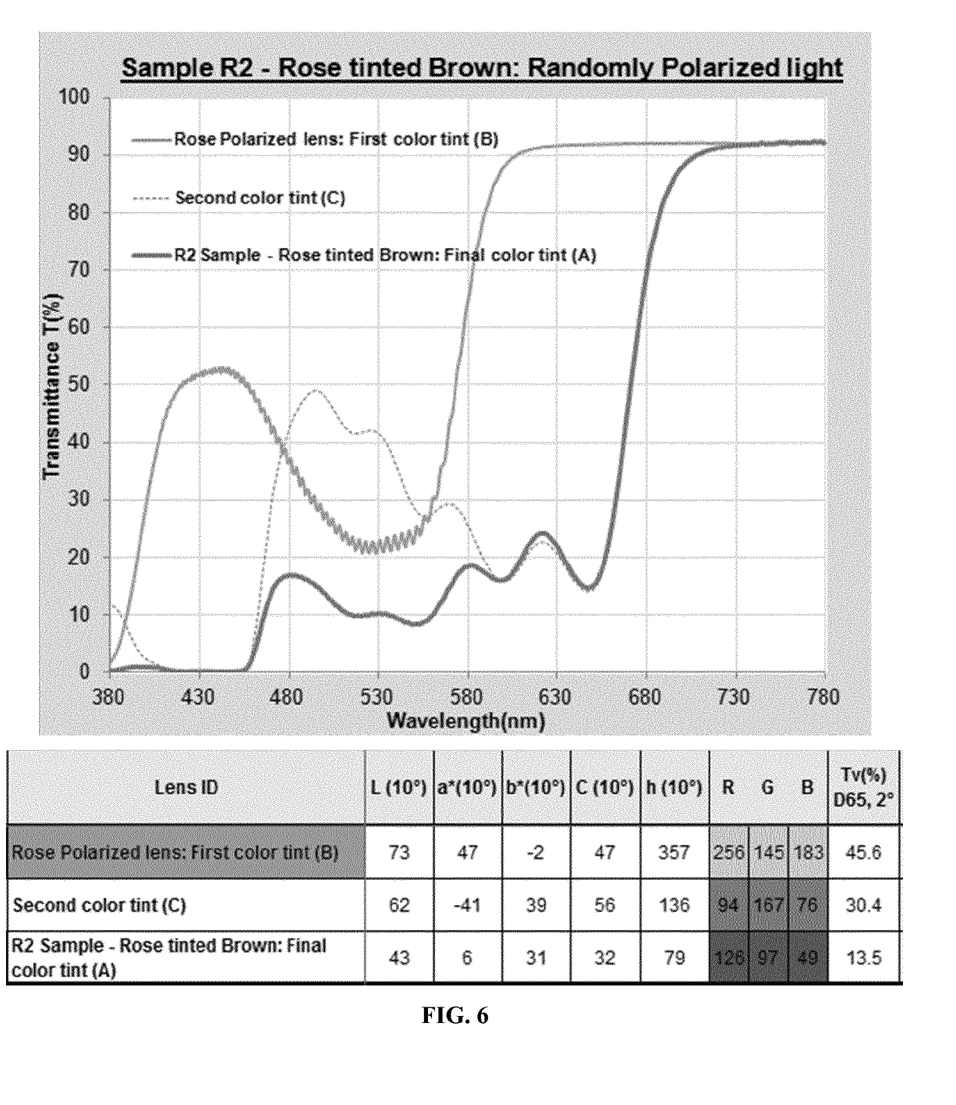
FIG. 6 is a graph that depicts transmittance across various visible wavelengths of a low polarizing efficiency rose-tinted lens (first color tint B), a second color tint C, and a brown lens product (final color tint A) that includes both the low polarizing efficiency rose-tinted lens and the second color tint.

In the present disclosure, a colored polarizing lens exhibiting low PE(λ) (FIG. 1) of less than 50% in a certain visible range, greater than 50% in the a different visible wavelength range and a % TV greater 30% is tinted to a neutral, e.g., grey, brown, or grey-green color through a tinting process so that the % iv of the tinted lens is reduced to a range of about 8% to 18% (category 3 range).

The Examples depicted in FIGS. 3-6 include transmittance spectra through a starting lens, a second color tint, and a finished, glare-enhancing lens. The lenses include the colors blue and rose. The PE(λ) for the blue lens is <50% in the 400-520 nm range (<30% in the 440-480 nm range) and >90% in the 600-700 nm range. The total PE (380-780 nm range) is around 60% and the % $\tau_v$ is around 47%. For the rose lens, the total PE was approximately 25% and the $\tau_v$ was about 25%. The lenses were tinted with complementary dyes to result in a grey or brown lens with % $\tau_v$~12%.

Figure 7A:
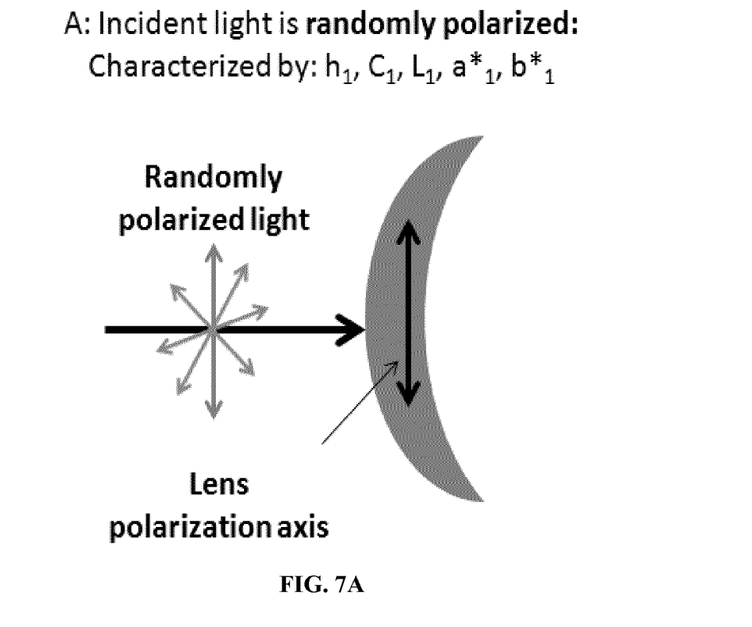
FIG. 7A is a drawing depicting randomly-polarized light incident upon a polarized lens. Light polarized perpendicular to the lens polarization axis is substantially absorbed by the lens and light polarized parallel to the lens polarization axis is substantially transmitted through the lens.
Figure 7B:
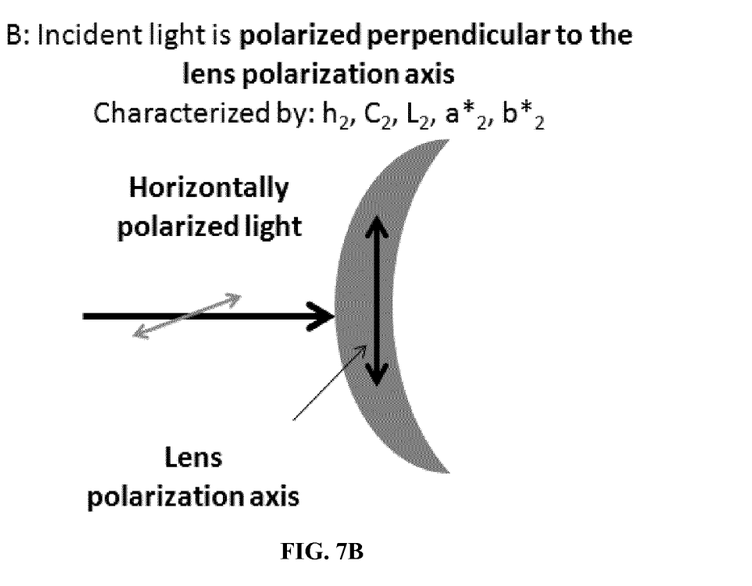
FIG. 7B is a drawing depicting horizontally-polarized light incident upon a polarized lens. Because the horizontally-polarized light is orthogonal to the polarized lens vertical polarizing filter axis, almost none of the light will pass through the lens.
Figure 8:
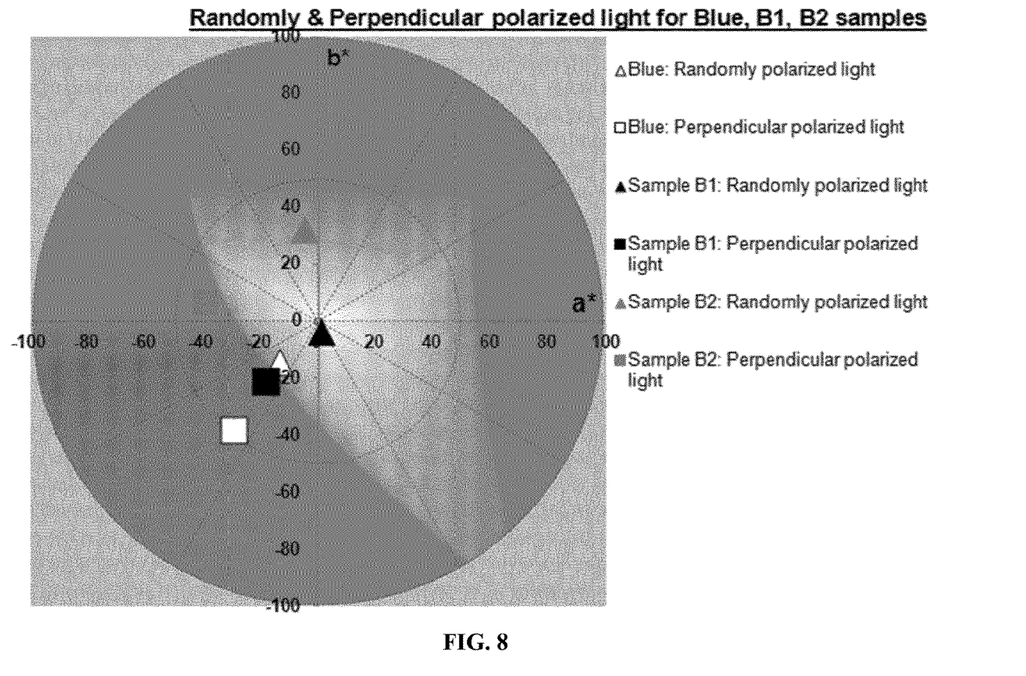
FIG. 8 is a CIElab color wheel that depicts color transmission for randomly polarized light and perpendicularly polarized light for sample blue, sample B1 (blue tinted to grey), and sample B2 (blue tinted to brown).
Figure 9:
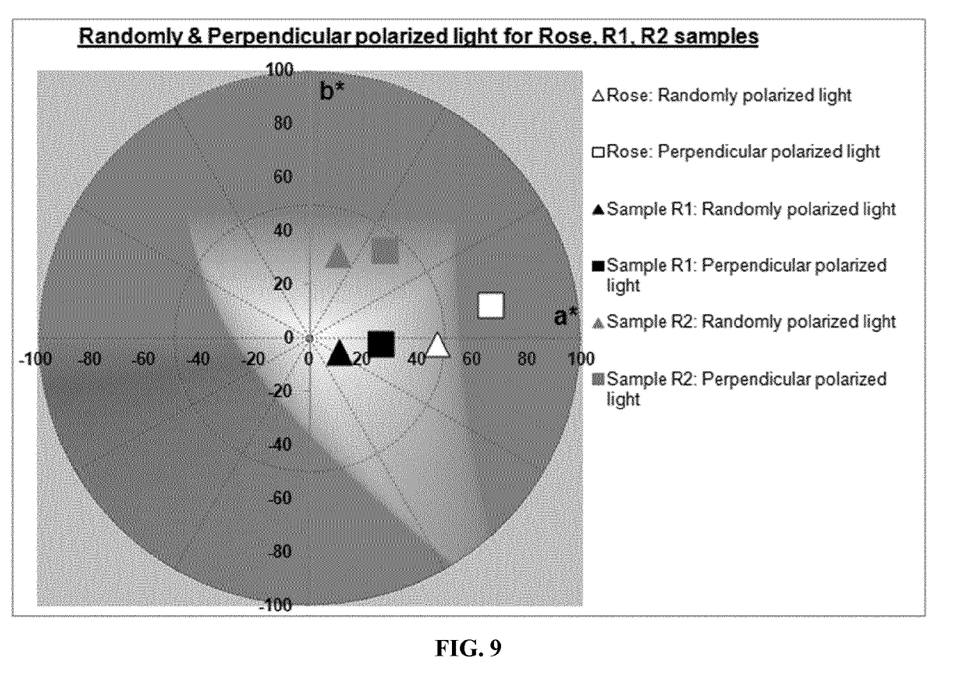
FIG. 9 is a CIElab color wheel that depicts color transmission for randomly polarized light and perpendicularly polarized light for sample rose, sample R1 (rose tinted to grey), and sample R2 (blue tinted to brown).

In some aspects, the lenses exhibit a difference in hue (Δh) between a hue of randomly-polarized light transmitted through the optical article and a hue of perpendicularly-polarized light transmitted through the optical article of at least 20 (see $h_1$ and $h_2$ in FIGS. 7A and 7B) and a lightness in response to perpendicularly-polarized light (L2) transmitted through the optical article of greater than 20.

When compared to a "typical polarized lens" of similar color (ΔEr (randomly polarized light)<20), in some embodiments the lenses have a significantly different color transmission for light polarized in a perpendicular direction (ΔEp (perpendicularly polarized light)>30).

TABLE 1

ΔE Randomly Polarized Light and ΔE Perpendicularly Polarized Light Between Two Lenses

| Incident light | Lens ID | L | a* | b* | ΔE |
|---|---|---|---|---|---|
| Randomly polarized light | Blue tinted grey (invention) | 40 | 1 | −4 | 8 |
| | Grey 3 standard lens (control) | 46 | −4 | −2 | |
| Perpendicularly polarized light | Blue tinted grey (invention) | 26 | −18 | −21 | 37 |
| | Grey 3 standard lens (control) | 2 | −1 | 2 | |

As depicted in Table 1 above, the ΔE of perpendicularly-polarized light between Grey 3 standard polar lens and the bluetinted grey lens of the present invention is greater than 30, while it is less than 10 for randomly polarized light. This demonstrates that a significant color difference is perceived for perpendicularly-polarized light.

Table 2 below compares color values between a blue lens tinted to brown and a rose lens tinted to brown, with a target brown control lens for transmission of randomly-polarized light.

TABLE 2

Δ E Randomly Polarized Light Between Brown and Brown-tinted Lenses

| Incident light | Lens ID | L | a* | b* | ΔE |
|---|---|---|---|---|---|
| Randomly polarized light | Blue tinted brown (invention) | 45 | −5 | 33 | 13 |
| | Brown 3 standard lens (control) | 45 | 8 | 36 | |
| Randomly polarized light | Rose tinted brown (invention) | 43 | 6 | 31 | 5 |
| | Brown 3 standard lens (control) | 45 | 8 | 36 | |

Optical parameters including color values and PE values for lenses having a first color tint, e.g., Lens ID "Blue", and the corresponding lenses also including a second color tint, e.g., Lens ID "B1" or "B2" are depicted below in Table 3. The values are measured for transmission of random or perpendicularly-polarized light through the lens.

TABLE 3

Color Values for Lenses With First Color Tint (B) and Lenses With Final Color Tint (A) Having A Second Color Tint

| First Color Tint | Final Color Tint | Lens ID | L | a* | b* | c | h | Tv(%) D65 | PE | \|Δh\| |
|---|---|---|---|---|---|---|---|---|---|---|
| Blue (B) | NA | Blue-Random | 75 | −14 | −15 | 20 | 227 | 47.4 | 59 | 5 |
| Blue (B) | NA | Blue-Perp | 53 | −30 | −38 | 48 | 232 | 19.3 | | |
| Blue | Grey (A) | B1-Random | 40 | 1 | −4 | 4 | 283 | 11.2 | 63 | 54 |
| Blue | Grey (A) | B1-Perp | 26 | −18 | −21 | 28 | 229 | 4.1 | | |
| Blue | Brown (A) | B2-Random | 44 | −5 | 32 | 33 | 99 | 13.9 | 69 | 71 |
| Blue | Brown (A) | B2-Perp | 26 | −40 | 7 | 40 | 170 | 4.4 | | |
| Rose (B) | NA | Rose-Random | 73 | 47 | −2 | 47 | 357 | 45.6 | 25 | 13 |
| Rose (B) | NA | Rose-Perp | 62 | 66 | 12 | 67 | 11 | 31.9 | | |
| Rose | Grey (A) | R1-Random | 39 | 11 | −5 | 12 | 334 | 10.3 | 32 | 22 |
| Rose | Grey (A) | R1-Perp | 42 | 26 | −2 | 26 | 355 | 7.0 | | |
| Rose | Brown (A) | R2-Random | 42 | 10 | 31 | 33 | 72 | 12.6 | 29 | 21 |
| Rose | Brown (A) | R2-Perp | 35 | 27 | 33 | 43 | 51 | 8.9 | | |

"Random" = randomly polarized light;
"Perp" = perpendicularly-polarized light

Optical parameters including color values and PE for some control lens examples are shown below in Table 4.

TABLE 4

Color Values for Control Lenses

| First Color Tint | Final Color Tint | Lens ID | L | a* | b* | c | h | Tv(%) D65 | PE | \|Δh\| |
|---|---|---|---|---|---|---|---|---|---|---|
| Grey 3 | NA | Grey 3-Random | 46 | −4 | −2 | 5 | 212 | 15.2 | 99 | 86 |
| Grey 3 | NA | Grey 3-Perp | 2 | −1 | 2 | 2 | 126 | 0.2 | | |
| Light Grey | NA | Light Grey-Random | 66 | −2 | 2 | 3 | 143 | 35.3 | 94 | 165 |
| Light Grey | NA | Light Grey-Perp | 17 | 10 | −13 | 17 | 306 | 2.1 | | |

The disclosure provides optical articles that impart a color onto plane-polarized light transmitted through the optical article. The color provided by the optical articles will highlight glare-causing areas to a user and can be tuned to achieve a desired color. The finished, glare-enhancing lenses can be used as regular sun lenses. When subjected to polarized glare, the lenses will bestow specific colors to polarized glare transmitted through the lens, thereby drawing attention to the glare spots.

The claims are not to be interpreted as including means-plus- or step-plus-function limitations, unless such a limitation is explicitly recited in a given claim using the phrase (s) "means for" or "step for," respectively.

The invention claimed is:

1. An optical article configured to color plane-polarized light transmitted through the optical article, the optical article having a color (A) and comprising:
   an optical article base material;
   a polarizing layer having a first color tint of color (B), the first color tint being provided within the polarizing layer; and a second color tint of color (C);
the colors (A, B, C) being described in the CIELAB color space;
wherein:
the second color of tint of color (C) is provided within the polarizing layer;
a difference in polarizing efficiency ($\Delta PE(\lambda)$) of light transmitted through the optical article is at least 30% between a first visible wavelength and a second different visible wavelength;
an overall polarizing efficiency (PE) of the optical article is less than 90%;
a color difference ($\Delta E$), calculated in the CIELAB color space, between the optical article color (A) and the first color tint color (B) is greater than 2;
a randomly-polarized white light (D65) color transmission difference ($\Delta Er$) between the optical article and a control lens having a color tint that is comparable to a target tint for the optical article is less than 20; and
a perpendicularly-polarized white light (D65) color transmission difference ($\Delta Ep$) between the optical article and a control lens having a color tint that is comparable to a target tint for the optical article is greater than 30.

2. The optical article of claim 1, wherein
a resulting difference in hue ($\Delta h$) between a hue of randomly-polarized white light (D65) transmitted through the optical article and a hue of perpendicularly-polarized white light (D65) transmitted through the optical article is at least 20; and
a lightness in response to perpendicularly-polarized light (L2) transmitted through the optical article is greater than 20.

3. The optical article of claim 1, wherein the difference in polarizing efficiency ($\Delta PE(\lambda)$) is greater than 30% in the range of 450 to 650 nm.

4. The optical article of claim 1, wherein the overall polarizing efficiency (PE) is between 10% and 90%.

5. The optical article of claim 1, wherein the first color tint is a dichroic dye or a mixture of dichroic dyes.

6. The optical article of claim 1, wherein the second color tint is a dye or a mixture of dyes.

7. The optical article of claim 1, wherein the optical article has an a* ranging from −10 to 10 in the CIELAB color space and a b* ranging from −10 to 10 in the CIELAB color space.

8. The optical article of claim 1, wherein the optical article has an a* ranging from 0 to 20 in the CIELAB color space and a b* ranging from 25 to 45 in the CIELAB color space.

9. The optical article of claim 1, wherein the optical article has an a* ranging from −20 to 0 in the CIELAB color space and a b* ranging from 0 to 20 in the CIELAB color space.

10. The optical article of claim 1, wherein the optical article is a sunglass lens, a goggle lens, a contact lens, a helmet shield, a windshield, a vehicle window, or a building window.

* * * * *